J. COYLE.
CAN SOLDERING MACHINE.
APPLICATION FILED MAY 25, 1909.

962,945.

Patented June 28, 1910.
2 SHEETS—SHEET 2.

Witnesses
C. H. Walker.
Albert A. Hopkins.

Inventor
John Coyle
By Sturtevant & Mason
Attorneys

UNITED STATES PATENT OFFICE.

JOHN COYLE, OF BALTIMORE, MARYLAND, ASSIGNOR TO CONTINENTAL CAN COMPANY, OF BALTIMORE, MARYLAND, A CORPORATION OF NEW JERSEY.

CAN-SOLDERING MACHINE.

962,945.  Specification of Letters Patent.  Patented June 28, 1910.

Application filed May 25, 1909. Serial No. 498,156.

*To all whom it may concern:*

Be it known that I, JOHN COYLE, a citizen of the United States, residing at Baltimore, in the State of Maryland, have invented certain new and useful Improvements in Can-Soldering Machines, of which the following is a description, reference being had to the accompanying drawing and to the figures of reference marked thereon.

The invention relates to new and useful improvements in soldering machines, and more especially soldering machines wherein the solder is applied to a seam by means of a soldering iron.

As herein illustrated, the invention is shown as applied to a machine for closing the side seam of a can body.

An object of the invention is to provide a soldering machine with a soldering iron which is charged with solder by being immersed in a solder bath.

A further object of the invention is to provide a solder bath with a soldering iron which is wholly or partially immersed in the solder bath, whereby the same is heated, and which iron is intermittently moved up and down so as to immerse the soldering face of the iron in the solder bath.

These and other objects will in part be obvious and will in part be hereinafter more fully described.

Figure 1:
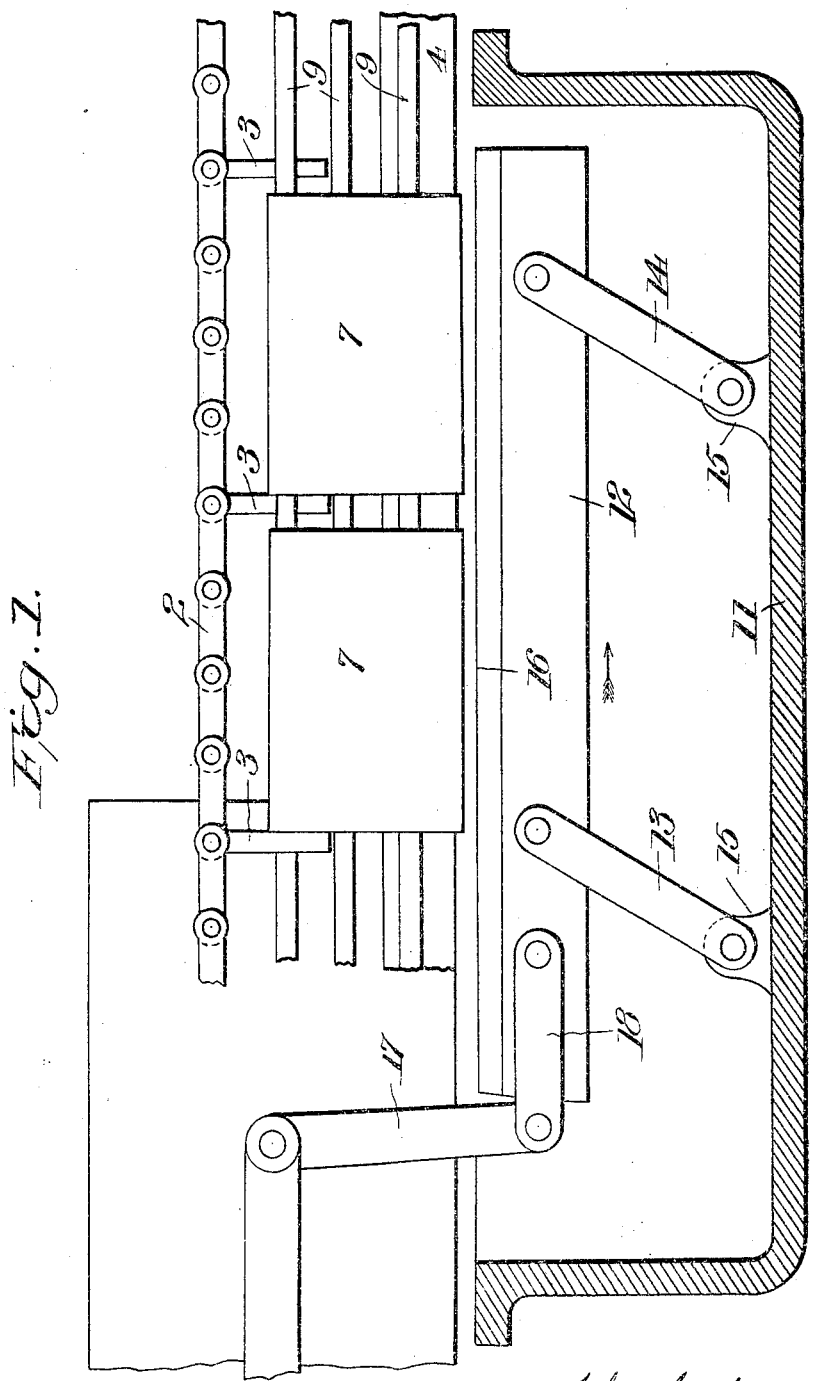
Figure 2:
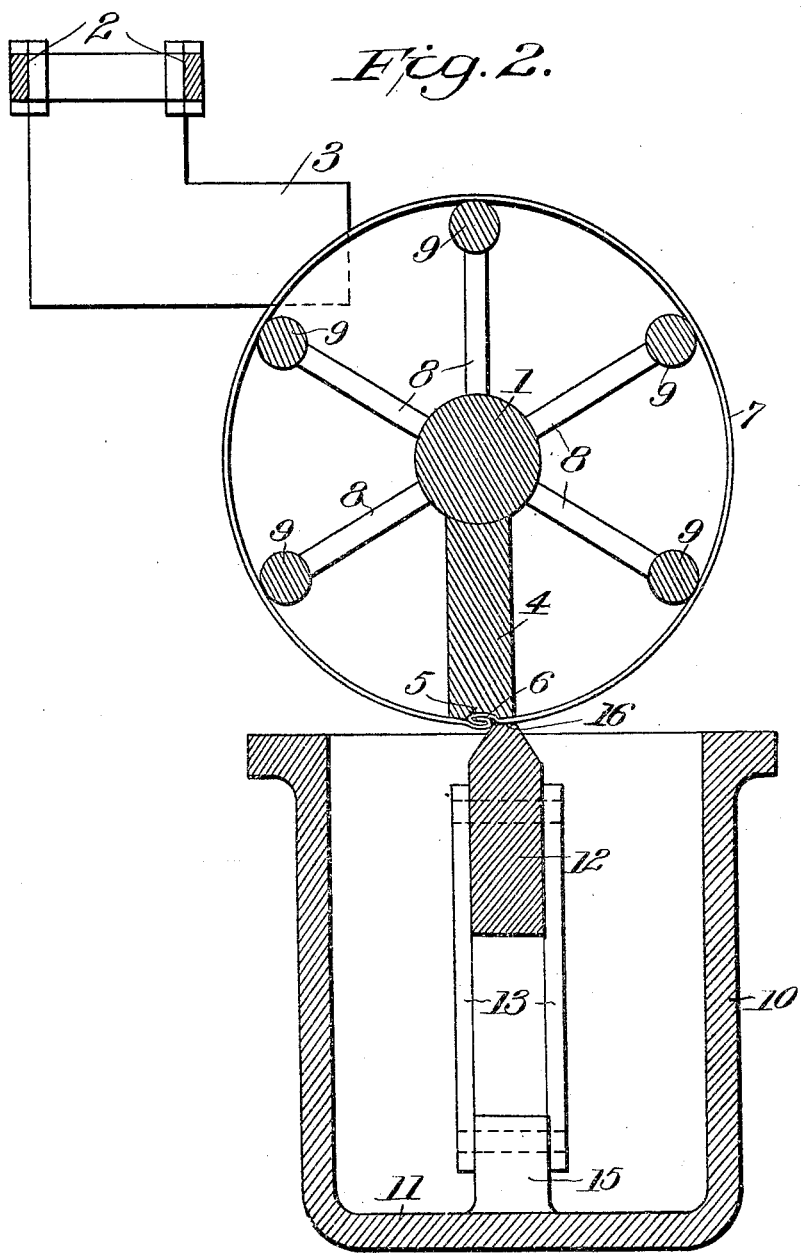

In the drawings which show by way of illustration, one embodiment of the invention,—Figure 1 is a side view of a portion of a soldering machine, with my invention applied thereto, certain parts being in section; Fig. 2 is a transverse sectional view through a part of the machine, showing my improved solder-applying means.

My invention is more especially adapted for applying solder to the seams of a can, and in the present illustration of the invention, I have shown the invention applied to a side seaming machine, although it will be obvious from certain aspects of the invention that my improved solder-applying means may be used in connection with other types of soldering machines.

The can bodies are formed in the usual manner, and the edges to be united are either overlapped or interlocked by folding, and are fed on to a supporting horn, 1, by a suitable chain feed 2, which carries projecting arms 3 that are brought into contact with the can bodies, so as to slide said can bodies along the horn.

The particular manner of feeding the can bodies forms no part of the invention, and it will be understood that any suitable feeding mechanism may be substituted for that herein shown.

The supporting horn for the can bodies is provided with a radial rib 4, which has in its lower face a recess 5, to receive the side seam 6 of the can body 7. In order to support the can body and hold the side seam properly disposed in the recess 5, I have provided radial arms 8, which carry supporting rods 9. One of the radial arms 8 is located diametrically opposite the supporting rib 4, so that the side seam will be properly positioned on the rib 4. The cans, as above noted, are supported on the horn and are slid along the same by the feed chain 2.

Directly underneath the horn 1 is a solder bath 10, which as herein shown comprises a bottom portion 11 with suitable sides extending upwardly therefrom. This solder bath may be heated by the usual means employed in this type of soldering machine. Within the solder bath is a soldering iron 12. Said soldering iron 12 is supported by a pair of links 13 at one end, and by a pair of links 14 at the other end. Said links are pivoted to a supporting lug 15, mounted on the bottom portion 11 of the bath. The links 13 and 14 (as shown in Fig. 1), are arranged at an incline to the vertical.

It will readily be seen that if the soldering iron is moved endwise in the direction of the arrow, shown in Fig. 1, the links 13 and 14 will at once carry the iron down away from the horn 1, and the soldering face of the iron beneath the surface of the solder in the bath. On the other hand, if the iron is moved endwise in the opposite direction, the links 13 and 14 will carry the soldering face of the iron up out of the bath charged with solder, into contact with the side seam of the can itself.

In Fig. 2 I have shown the iron at its upper edge as beveled or cut away, so as to form a substantially narrow soldering face 16. The width of the soldering face 16 will determine the amount of solder applied to the side seam. The horn 1 will, of course, be so disposed that when the iron is raised, the soldering face of the iron will be brought into proper contact with the side seam.

As a means for moving the iron 12 endwise, so as to intermittently immerse the soldering face thereof, I have provided a lever 17, which is connected by means of a link 18 to the iron. Said lever 17 may be vibrated in any suitable way, as by a cam or an eccentric upon a cross shaft running through the machine. By the intermittent immersing of the iron beneath the solder bath, I am able to keep the soldering surface of the iron clean, and in proper condition for applying solder to the seam. Furthermore, the iron will be properly heated by being immersed in the bath of solder.

Having thus described my invention, what I claim as new and desire to secure by Letters Patent, is:—

1. In a soldering machine, the combination with a soldering iron, means for continuously feeding cans to said iron, and for moving the side seam in endwise contact therewith, a solder bath, means for supporting said soldering iron in said bath, and means for intermittently raising the soldering face of said iron out of said bath and into contact with the side seam of the can.

2. In a soldering machine, the combination of a soldering iron, means for feeding cans to said iron and for moving the side seam in contact therewith, a solder bath, means for moving said iron endwise, and means for supporting said iron, whereby the endwise movement thereof causes the iron to be intermittently immersed in the solder bath.

3. In a soldering machine, the combination of a soldering iron, means for feeding cans to said iron and moving the side seam in contact therewith, a solder bath, said soldering iron being located in said solder bath, means for moving said iron endwise, and means for supporting said iron, whereby said iron as it is moved endwise is bodily moved up and down, so as to immerse the soldering face of said iron in the solder bath.

4. In a soldering machine, the combination of a soldering iron, means for feeding cans to said iron and for moving the side seams in contact therewith, a solder bath, said iron being located in said solder bath, means for moving the iron endwise, inclined links pivoted at one end to said soldering iron and at the other end to the solder bath.

5. In a soldering machine, the combination of a supporting horn including a rib for supporting the side seam of a can at the lower face of the horn, a solder bath beneath said horn, a soldering iron located in said soldering bath and contacting with said side seam, means for immersing said iron in the bath to charge the iron with solder and means for sliding the side seam along said iron.

6. In a can-soldering machine, the combination of a supporting horn, including a rib having a recess to receive the side seam of the can and position the same at the lower side of the horn, radial arms having supporting rods coöperating with said rib for supporting the can body, one of said radial arms being diametrically opposite the supporting rib, whereby the side seam is held in the recess in said rib, a bath located beneath said horn, a soldering iron in said bath, adapted for applying solder to said side seam, means for bodily immersing said soldering iron in the solder bath, whereby said soldering iron is charged with solder and means for sliding the side seam along said iron.

7. The combination of a supporting horn, means for moving can bodies along said horn, a solder bath located beneath said horn, a soldering iron located beneath said horn, means connected to said soldering iron for positively moving said iron intermittently beneath the surface of the solder, whereby the iron is charged with solder, and for raising said iron into contact with the moving can bodies.

In testimony whereof I affix my signature, in presence of two witnesses.

JOHN COYLE.

Witnesses:
   DANIEL P. ROBINSON,
   JOHN W. HEWES.